June 5, 1951 A. ALLAN ET AL 2,556,054
SPRING DRIVEN OPERATING MECHANISM
FOR ELECTRIC SWITCHGEARS
Filed July 30, 1945 3 Sheets-Sheet 3
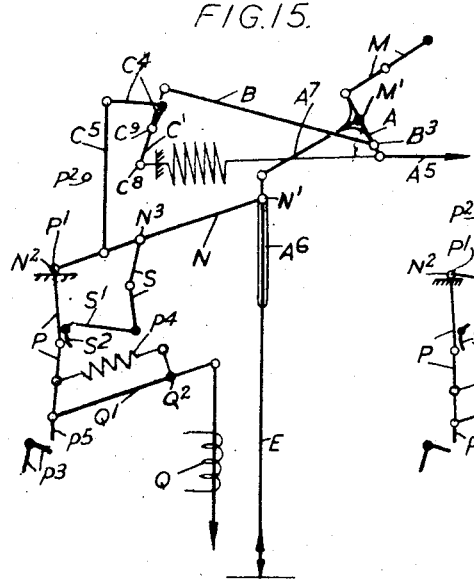
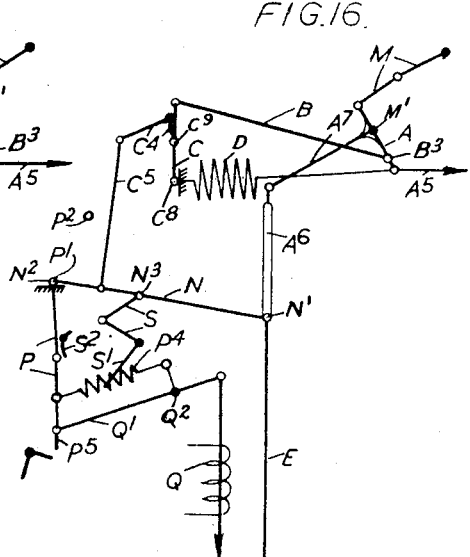
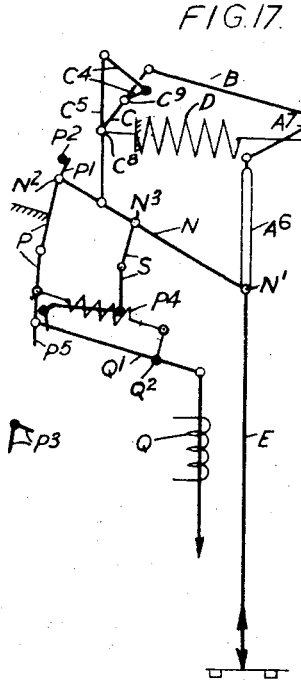
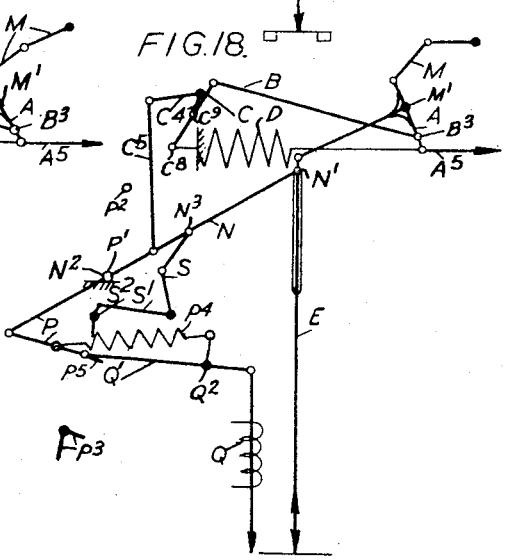
Inventor
a. Allen +
J. J. S. Small
By
Watson, Cole, Grindle
+ Watson
Attorney Patented June 5, 1951

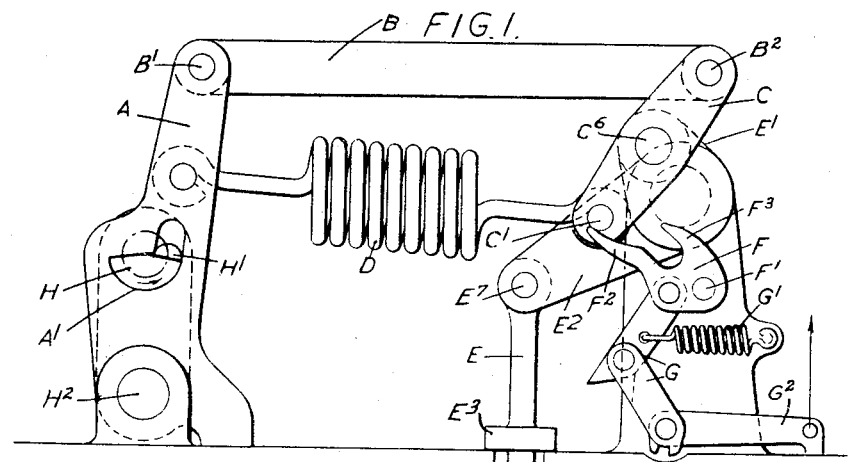
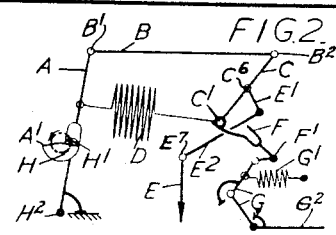
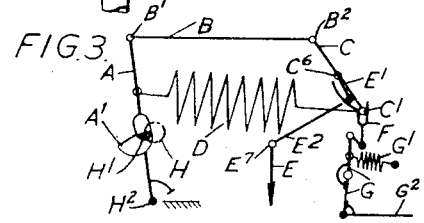
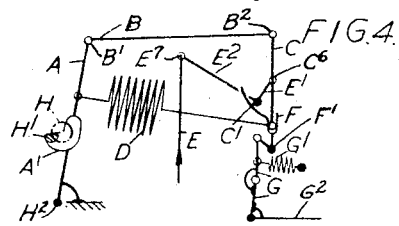
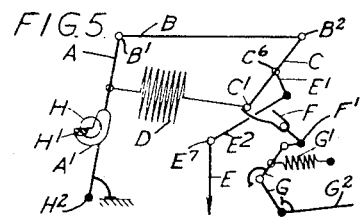
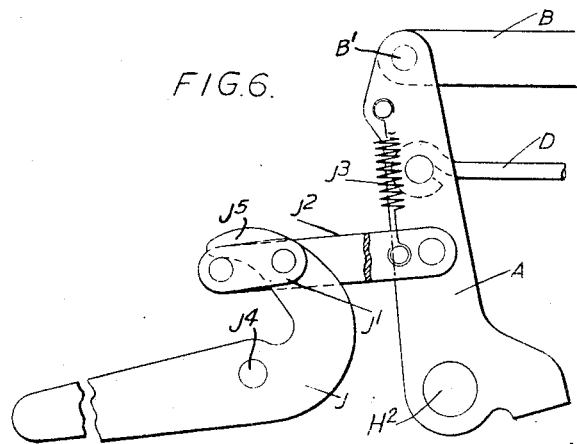

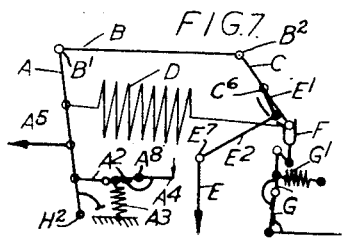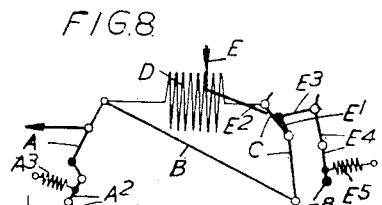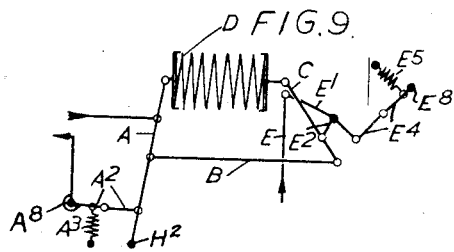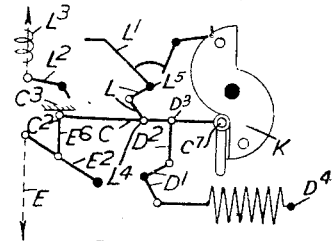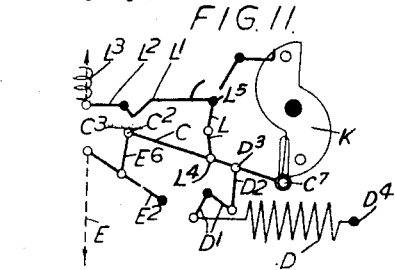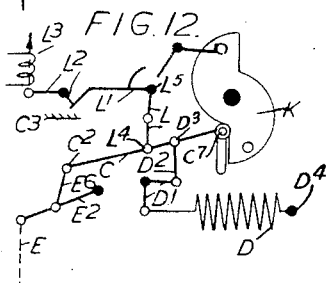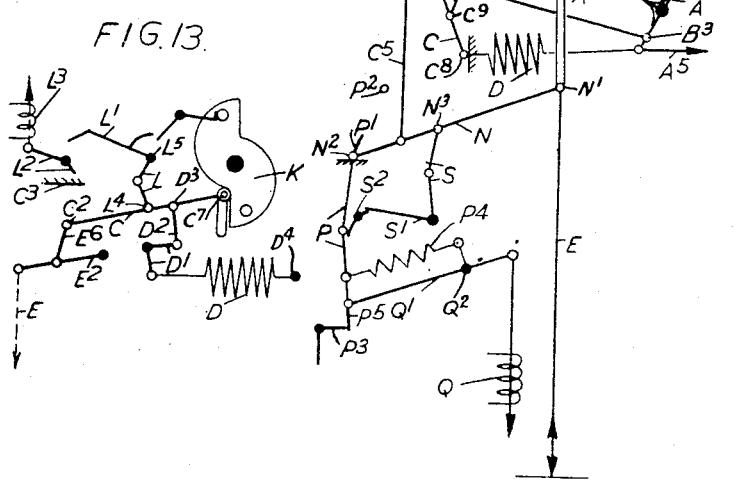

2,556,054

UNITED STATES PATENT OFFICE 2,556,054

SPRING-DRIVEN OPERATING MECHANISM FOR ELECTRIC SWITCHGEARS

Archibald Allan, Whitley Bay, and Joseph Frederick Strickland Small, Gateshead, England, assignors to A. Reyrolle & Company Limited, Hebburn-on-Tyne, England, a company of Great Britain Application July 30, 1945, Serial No. 607,880
In Great Britain July 31, 1944

12 Claims. (Cl. 200—92)

This invention relates to spring operating mechanism for electric switch gear and an object is to provide a more efficient and convenient form of such mechanism, which will provide a snap action make and break without requiring a spring for the first operation, say the closing operation, which is of sufficient power not only to perform that operation but also to store energy in another spring for the subsequent opening operation.

Broadly speaking, the mechanism comprises a differential device, conveniently but not essentially a differential lever, having three interdependent elements, an operative connection between one of these elements and the switch parts to be operated, means for charging the mechanism by a movement of the differential device, means for holding stationary the element connected to the switch parts during this charging movement, two detents one for retaining each of the other two differential elements against movement in a direction opposite to that imparted to it by the charging means, a spring acting on the differential device and tending to move each of the latter two elements in a direction opposite to that imparted to it by the charging means, means for releasing one detent so that the spring moves the switch parts in one direction, for instance to close the switch contacts, and means for thereafter releasing the other detent so that the spring moves the switch parts in the opposite direction, for instance to open the switch contacts.

The term "differential device" used herein is intended to mean a device comprising three elements each capable of movement but so interconnected that the movement of any one element is the algebraic sum of two components each proportional to the movement of one of the other elements. Thus a simple form of differential device comprises a floating lever having three pivots spaced apart and constituting three elements, the movements of which are interrelated in the manner referred to. The same effect can however be obtained with a bevel or epicyclic type of differential gear.

Since in the present invention the same spring brings about the closing and the opening movements of the contacts the invention is clearly distinguished from types of switch-operating mechanism which have hitherto been proposed in which movement of the switch contacts in one direction is brought about by a spring, and in the other direction is effected by some other means, for instance the force of gravity acting on a suspended weight.

The invention may be employed in conjunction with simple switchgear or with switch gear of the auto-reclosing type. In the latter case the energy for the initial closing and final opening movements, and the additional energy for the other opening and the reclosing shots, may be stored in the same spring system. Conveniently the mechanism includes two differential devices in series associated respectively with two different means for charging the spring system. Such an arrangement is suitable for multiphase switchgear in which one or more opening and reclosing shots are performed only by the faulty phase, whereas the final opening, if the fault is not cleared, is performed by each phase with its original store of energy. In this case the energy for opening and reclosing shots may be provided by electro-magnetic coils in series and associated one with each of the phases.

The invention may be carried into effect in various ways but certain specific embodiments will be described by way of example with reference to the accompanying drawings in which—

Figure 1 is a side view of one form of spring mechanism for the operation of switch gear, Figures 2, 3, 4 and 5 are schematic diagram showing the mechanism of Figure 1 in four different positions, respectively the discharged condition, the fully charged condition, the partially discharged condition with the closing detent tripped, and the fully discharged condition with the opening detent tripped.

Figure 6 is a view similar to part of Figure 1 of a modified form of charging means, Figure 7 is a diagram similar to Figure 3 showing a modified form of charging means held by a toggle, Figure 8 is a similar diagram showing a further modification, Figure 9 is a similar diagram of a modified arrangement employing a spring in compression, Figures 10–13 are schematic diagrams of a further arrangement in four different positions, and Figures 14–18 are schematic diagrams of a further arrangement still, serving to provide auto reclosing.

In the schematic diagrams the circles representing fixed pivots are blacked in to distinguish them from those representing movable pivots.

In the arrangement shown in Figures 1–5 an operating lever A, pivoted at its lower end on a pin $H^2$, has its upper end connected by a pin $B^1$ to a rigid link B. The other end of this link is connected by a pin $B^2$ to the upper end of a floating differential lever C of which the lower end is provided with a pin $C^1$ whereby it is connected to the operating lever A through the tension spring D in which the operating energy is stored.

The centre of the differential lever is connected by a pin $C^6$ to the moving parts E of the switch to be operated, for example it may be pivoted to one arm $E^1$ of a bell crank of which the other arm $E^2$ is connected by a pin $E^7$ to those parts. Movement of the bell crank and the centre of the differential lever towards the operating lever is limited by the stop $E^3$ so that when the operating lever is moved away the rigid link B pulling the pin $B^1$ and upper end of the differential lever forces the lower end and the pin $C^1$ to move away in the opposite direction. This pulls the attached end of the spring D in one direction while the direct connection to the operating lever A through the link B pulls the other end of the spring in the opposite direction.

In effect the opposite ends of the differential lever constitute two elements of a differential device which are operatively connected to opposite ends of the spring so that the latter tends to move them in opposite directions. The third element of the differential device is the centre of the lever which will move in one direction if one end is allowed to move under the action of the spring and in the opposite direction if the other end is allowed to move, provided that the end opposite to the moving end is held stationary.

Suitable detents or trigger devices are provided to prevent or permit such movement of the opposite ends of the differential lever at the appropriate times. Such mechanism may be of any design suitable for the purpose. In one arrangement the pin $C^1$ connecting the spring to the lower end of the differential lever cooperates with a pivoted fork F which is urged to turn about its pivot $F^1$ by a toggle G having a small spring $G^1$ urging it towards its dead centre position. One prong $F^2$ of the fork is extended and curved and the pin $C^1$ rides against this curved surface and prevents it from turning as described. When the pin $C^1$ reaches the other prong $F^3$, however, the fork can turn and the toggle is pulled by its spring to or slightly beyond its dead centre and prevents return movement of the pin $C^1$ and hence of the lower end of the differential lever.

Movement of the upper end of the differential lever is conveniently controlled by controlling the movement of the operating lever. The latter must first be moved in one direction, away from the differential lever, to charge the spring, and thereafter must be suddenly released to perform the first operation of the switch. If this is to take place without a pause it may be achieved by a combined cocking and trigger mechanism.

This may be of any design suitable for the purpose. For example in the arrangement shown a crank H mounted to turn about the pin $H^2$ has a D-shaped crank pin $H^1$ engaging in a slot $A^1$ in the operating lever which is of substantially J-shape comprising a semi-circular portion with a tangential extension. With the mechanism in the released condition the semicircular portion is coaxial with the crank and as the pin $H^1$ moves round this portion in an anticlockwise direction, nothing happens during the first half turn. Then the pin $H^1$ enters the tangential extension and swings the operating lever over, charging both ends of the spring as already described. At the end of this half turn the pin comes back into the semicircular part of the slot and hence releases the operating lever, which flies back to its original position under the action of the spring. In the meantime however, the pin $C^1$ at the lower end of the differential lever has been locked by its trigger device F, G so that the return movement of the differential lever is not merely a reversal of its charging movement, but as its lower end is locked its centre is obliged to move and hence operation of the switch parts is brought about. The return movement is produced when the toggle F, G, locking the lower end of the differential lever is released by raising the arm $G^2$, allowing the lower end to move in the opposite direction to that in which the upper end moved and hence bringing the centre back to its original position.

Other forms of combined cocking and trigger mechanism may be used instead of that described. In one arrangement shown in Figure 6 the device comprises a hooked lever J pivoted at $J^4$ and connected to the operating lever by a toggle having a short link $J^1$ in compression and a long link $J^2$ in tension. The lever J is moved in an anticlockwise direction for charging and the arrangement is such that during this movement the short link $J^1$ bears against the hook $J^5$ and moves as if it were part of the hooked lever. The movement takes it towards and over its dead centre whereupon it suddenly releases the operating lever as the short link moves into the crook of the hook shaped lever. A small spring $J^3$ serves to move it back over the dead centre when the hooked lever is released. Other forms of combined cocking and trigger mechanism include for example a spiral cam.

Where it is desired to charge the spring but not immediately to operate the switch the means for locking both elements of the differential device will be independent of the charging means. In this case any convenient means may be provided for moving the operating lever and any convenient trigger for locking and releasing it. For example as shown in Figure 7 the trigger may be afforded by a toggle $A^2$ connecting the operating lever to a fixed point $A^8$, and provided with a spring $A^3$ urging it towards its dead centre and tripping means $A^4$ for moving it the opposite way.

In the arrangements so far described the element to which a force is applied to charge the spring is released to perform the first operation of the switch and in this case the element connected to the switch parts, in this case the centre of the differential lever, does not require special locking means as it is at the limit of its travel in the direction in which it is being urged. In another arrangement shown in Figure 8 the element referred to produces the return movement and means is provided for locking the centre of the differential lever during the charging operation. For this purpose the bell crank $E^1E^2$ is provided with a third arm $E^3$ connected to a fixed point $E^8$ through a toggle $E^4$ which is urged by a small spring $E^5$ to or slightly beyond its dead centre, when the mechanism is in its released condition. No toggle or other form of trigger device is then required for the end of the differential lever connected directly to the spring since if two elements of a differential device are locked the third element cannot move. The toggle $E^4$ is released first to allow the first operating movement of the switch, and subsequently the toggle $A^2$ controlling the operating lever is released to allow the return movement. It will be realised that the first operation in this case takes place in the opposite direction to the corresponding movement in the mechanisms previously described.

The arrangement of Figure 9 is similar to that of Figure 8 except that the spring works in compression.

Although it is convenient to use both ends of a single spring, in some cases one end of a single spring may be used with suitable mechanism.

For example in the arrangement shown in Figures 10–13 one end of the differential lever is connected to the moving parts E of the switch while the other end and an intermediate point are controlled to allow the two operations. In this case the spring force at both these points is required to be in the same direction and may be produced by a single spring D having one end connected to a point $D^3$ of the lever between them and the other end anchored to a fixed point $D^4$.

In the particular arrangement shown in Figures 10–13 the charging and first release is performed by a combined cocking and releasing device constituted by a double spiral cam K. This acts on the right hand end $C^7$ of the differential lever C so as to force it downwards and then release it. The left hand end $C^2$ of the differential lever is limited in its upward movement by a stop $C^3$ and is connected by a link $E^6$ to the arm $E^2$ which operates the moving parts E of the switch. A point $L^4$ on the differential lever approximately midway in its length is connected to one end of a toggle L having its opposite end carried by a fixed pivot $L^5$. An arm $L^1$ integral with the upper link of the toggle L is controlled by a detent $L^2$ and coil $L^3$. The spring D has one end connected to the fixed anchorage $D^4$ whilst the other end operates through a bell crank $D^1$ and link $D^2$ on the point $D^3$ of the differential lever between the toggle L and the right hand end $C^7$ of the lever. By urging this point $D^3$ upwardly the spring tends to urge both the points $L^4$ and $C^7$ upwardly and to urge the left hand end $C^2$ of the lever up or down depending on which of the points $L^4$ and $C^7$ is held fixed.

The operation of the arrangement shown in Figures 10–13 is as follows.

When the parts are in the position shown in Figure 10 in which the switch is open the cam is rotated through half a revolution to the position shown in Figure 11. This forces the right hand end $C^7$ of the lever downwardly and as the upward movement of its left hand end $C^2$ is limited by the stop $C^3$ the spring is charged. Shortly before the cam reaches the position shown in Figure 11 the toggle L approaches its dead centre position and the arm $L^1$ attached to it rides over the detent $L^2$ which prevents the toggle from collapsing again. As the tip of the cam passes the end $C^7$ of the lever the latter is free to spring upwardly again and does so as indicated in Figure 12. But now the toggle L prevents the point $L^4$ of the lever from moving upwards and hence its left hand end $C^2$ must move downward thereby closing the switch with a snap action. The switch remains closed until the toggle L is allowed to collapse due to tripping of the detent $L^2$ either manually or electrically by the trip coil indicated at $L^3$.

In the auto-reclosing arrangement shown in Figures 14–18, which is suitable for use in a multiphase system, a single spring D is associated with two differential levers so that it can be charged partially by a series electromagnetic coil associated with the particular phase, and partially by other means. In such an arrangement it is convenient only to rely on the series coil functioning on the particular phase which is faulty, since it is the fault current that provides its energy. Accordingly in the arrangement shown charging means operated manually or by some means independent of the series coil is provided for charging the spring D with the energy for initial closing and final opening, the series coil being relied on to provide energy for as many opening and reclosing shots as may be desired.

The general arrangement of the spring D and primary differential lever C is somewhat similar to that of Figures 1–5 although it appears partially inverted in the drawing. Thus the operating lever A for manual operation forms part of the bell crank turning about a fixed pivot $M^1$ and connected at its lower end to primary hand charging mechanism $A^5$ and to one end of the spring D and at a neighbouring point $B^3$ connected through a link B to the upper end of the differential lever C of which the lower end $C^8$ is connected to the left hand end of the spring D. Thus if the operating lever is turned in an anticlockwise direction it will directly pull the right hand end of the spring D to the right and if the middle point $C^9$ of the lever C is held stationary it will also pull the left hand end of the spring to the left as indicated in Figure 15. A toggle M is connected to the upper end of the operating lever A so as to hold it in its anticlockwise position.

The middle point $C^9$ of the differential lever C instead of operating the moving parts E of the switch directly does so through a second differential lever N, which is somewhat similar to that of Figures 10–13. The right hand end $N^1$ of this lever is connected to the moving parts E of the switch whilst its left hand end $N^2$ is connected to a toggle P, which also serves as a strut to communicate a secondary charging movement to the differential lever N from the series coil Q by means of a lever $Q^1$. The lever $Q^1$ can rock about a fixed pivot $Q^2$. About the middle of the differential lever N a point $N^3$ is controlled by a toggle S having an additional arm $S^1$ controlled by a detent $S^2$. Between this point $N^3$ of the lever N and its left hand end $N^2$ the lever is operatively connected to the middle point of the primary differential lever C through a bell crank $C^4$ and a link $C^5$. Thus with the parts in the position shown in Figure 15 the spring is charged with sufficient energy to bring about an initial closing movement and the final opening movement. As it comes into this position a bell-crank lever $P^3$ connected to the charging means $A^5$ by linkage omitted for clarity, releases an extension $P^5$ of the lower member of the toggle P and permits movement of the toggle under the influence of the tension spring $P^4$ to trip the detent $S^2$ and collapse the toggle S so that the second differential lever N is free to descend and close the switch contacts as shown in Figure 16. The switch remains in this condition until a fault occurs in which case the fault current energising the coil Q will rock the lever $Q^1$ about its pivot $Q^2$ and so lift the toggle P and with it the left hand end of the second differential lever N upwards to the position shown in Figure 17. This enables the toggle S to reset itself shortly before an extension $P^1$ on the end of the upper link of the toggle P engages a fixed stop $P^2$ and collapses the toggle P. Thus the differential lever pivots in an anticlockwise direction about the upper end of the toggle S so as to open the contacts as shown in Figure 18. The opening of the contacts breaks the circuit so that the current in the coil Q ceases and the lower end of toggle P is lowered and the toggle is again set to the position shown in Figure 15. The movement of the toggle to the right trips the detent S² and collapses the toggle S so that the contacts close again to the position shown in Figure 16.

The process of opening and reclosing is repeated, so long as the fault current persists, until, when a predetermined number of shots have been tried, a timing device trips the toggle M. This allows the operating lever A to move in a clockwise direction and a slotted link A⁶ carried by an additional arm A⁷ on the operating lever A lifts the contacts to the open position and locks them there. The timing device is arranged to operate on the mechanism of the companion phases as well as its own phase so that when the final opening movement occurs all phases are opened and not merely the one on which the fault occurred. A suitable timing device comprises the well known "Automatic Electric Sequence-Timer" marketed by A. Reyrolle & Co. Ltd., Hebburn-on-Tyne, England.

What we claim as our invention and desire to secure by Letters Patent is:

1. Spring driven operating mechanism for an electric switch having switch parts adapted to be operated by said mechanism, comprising a differential lever, three pivots spaced apart along the lever, an operative connection between one pivot and the switch parts to be operated, means for imparting a rotative movement to the differential lever about the pivot connected to the switch parts for charging the mechanism, means adapted to hold the said pivot connected to the switch parts stationary during this charging movement, two detents one for retaining each of the other two pivots against movement in a direction opposite to that imparted to it by the charging means, a spring acting on the differential lever tending to move each of the two latter pivots in a direction opposite to that imparted to it by the charging means, means for releasing one detent so that said spring moves the switch parts in one direction, and means for thereafter releasing the other detent so that said spring moves the switch parts in the opposite direction.

2. Spring driven operating mechanism for an electric switch having switch parts adapted to be operated by said mechanism, comprising a differential lever, three pivots spaced apart along the lever, an operative connection between the intermediate pivot and the switch parts to be operated, means for charging the mechanism by a rotative movement of the lever about the intermediate pivot whereby the two extreme pivots are moved in opposite directions, means adapted to hold the intermediate pivot stationary during this charging movement, two detents one for retaining each of the said two extreme pivots against movement in a direction opposite to that imparted to it by the charging means, a spring acting on the differential lever tending to move each of the two extreme pivots in a direction opposite to that imparted to it by the charging means, means for releasing one detent so that said spring moves the switch parts in one direction, and means for thereafter releasing the other detent so that said spring moves the switch parts in the opposite direction.

3. Spring driven operating mechanism for an electric switch having switch parts adapted to be operated by said mechanism, comprising a differential lever, three pivots spaced apart along the lever, an operative connection between one pivot and the switch parts to be operated, means for charging the mechanism by a rotative movement of the differential lever about the pivot connected to the switch parts, means adapted to hold the said pivot connected to the switch parts stationary during this charging movement, two detents one for retaining each of the other two pivots against movement in a direction opposite to that imparted to it by the charging means, a spring, operative connections between each end of the spring and the two pivots associated with the said detents, said spring tending to move each of the two said pivots in a direction opposite to that imparted to them by the charging means, means for releasing one detent so that one end of said spring moves the spring parts in one direction, and means for thereafter releasing the other detent, so that the other end of said spring moves the switch parts in the opposite direction.

4. Spring driven operating mechanism for an electric switch as claimed in claim 3 in which the amount of energy released from the spring by the first release of one detent is different from the amount of energy released by the subsequent release of the other detent.

5. Spring driven operating mechanism for an electric switch having switch parts adapted to be operated by said mechanism, comprising a differential lever, three pivots spaced apart along the lever, an operative connection between the intermediate pivot and the switch parts to be operated, means for charging the mechanism by a rotative movement of the lever about the intermediate pivot whereby the two extreme pivots are moved in opposite directions, means adapted to hold the intermediate pivot stationary during this charging movement, two detents one for retaining each of the said two extreme pivots against movement in a direction opposite to that imparted to it by the charging means, a spring, operative connections between each end of the spring and the said two extreme pivots, said spring tending to move each of the said two extreme pivots in a direction opposite to that imparted to them by the charging means, means for releasing one detent so that one end of said spring moves the switch parts in one direction, and means for thereafter releasing the other detent so that the other end of said spring moves the switch parts in the opposite direction.

6. Spring driven operating mechanism for an electric switch as claimed in claim 5 in which the amount of energy released from the spring by the first release of one detent is different from the amount of energy released by the subsequent release of the other detent.

7. Spring driven operating mechanism for an electric switch having switch parts adapted to be operated by said mechanism, comprising a differential lever, three pivots spaced apart along the lever, an operative connection between one extreme pivot and the switch parts to be operated, means for charging the mechanism by a rotative movement of the lever about the said extreme pivot whereby the other extreme pivot and the intermediate pivot are moved in the same direction, means adapted to hold the first extreme pivot stationary during the charging operation, a detent adapted to retain the second extreme pivot and a second detent adapted to retain the intermediate pivot against movement in the direction opposite to that imparted to them by the charging means, a spring acting on the differential lever tending to move the second extreme pivot and the intermediate pivot in the direction opposite to that imparted to them by the charging means, means associated with the charging means for automatically releasing the first detent on the completion of the charging movement so that said spring moves the switch parts in one direction, and means for thereafter releasing the second detent so that said spring moves the switch parts in the opposite direction.

8. Spring driven operating mechanism for an electric switch having switch parts adapted to be operated by said mechanism, comprising a differential lever, three pivots spaced apart along the lever, an operative connection between the intermediate pivot and the switch parts to be operated, means for charging the mechanism by a rotative movement of the lever about said intermediate pivot whereby the two extreme pivots are moved in opposite directions, means adapted to hold the intermediate pivot stationary during this charging movement, two detents one for retaining each of the said two extreme pivots against movement in a direction opposite to that imparted to it by the charging means, a spring, operative connections between each end of the spring and the said two extreme pivots, said spring tending to move each of the said two extreme pivots in a direction opposite to that imparted to them by the charging means, means associated with the charging means for automatically releasing one detent on the completion of the charging movement so that one end of said spring moves the switch parts in one direction, and means for thereafter releasing the other detent so that the other end of said spring moves the switch parts in the opposite direction.

9. Spring driven operating mechanism for an electric switch having switch parts adapted to be operated by said mechanism, comprising a differential device with three interdependent elements, an operative connection between one of the said elements and the switch parts to be operated, primary charging means for charging the mechanism by a rotative movement of the differential device, means adapted to hold the said element connected to the switch parts stationary during this charging movement, a detent for retaining one of the other elements against movement in a direction opposite to that imparted to it by the primary charging means, a spring acting on the differential device tending to move the element associated with the said detent in a direction opposite to that imparted to it by the charging means, means arranged in the operative connection between the differential device and the switch parts adapted to release the element connected to the switch parts after completion of the charging movement to effect an initial closure of the switch, secondary charging means for supplying additional energy for one or more pairs of opening and reclosing movements of the switch without affecting the charge available in the spring for a final opening movement of the switch, and means for thereafter releasing the said detent so that said spring brings about a final opening movement of the switch.

10. Spring driven operating mechanism for an electric switch having switch parts adapted to be operated by said mechanism, comprising a differential device with three interdependent elements, an operative connection between one of the said elements and the switch parts to be operated, primary charging means for charging the mechanism by a rotative movement of the differential device, means adapted to hold the said element connected to the switch parts stationary during this charging movement, a detent for retaining one of the other elements against movement in a direction opposite to that imparted to it by the primary charging means, a spring acting on the differential device tending to move the element associated with the said detent in a direction opposite to that imparted to it by the charging means, means arranged in the operative connection between the differential device and the switch parts adapted to release the element connected to the switch parts after completion of the charging movement to effect an initial closure of the switch, secondary charging means for supplying additional energy to the said spring for one or more pairs of opening and reclosing movements of the switch without affecting the charge available in the spring for a final opening movement of the switch, and means for thereafter releasing the said detent so that said spring brings about a final opening movement of the switch.

11. Spring driven operating mechanism for an electric switch having switch parts adapted to be operated by said mechanism, comprising first and second differential devices each with three interdependent elements, an operative connection between one element of the first differential device and the second differential device, an operative connection between one element of the second differential device and the switch parts to be operated, primary charging means for charging the mechanism of the first differential device, means adapted to hold the element connected to the second differential device stationary during this charging movement, a primary detent for retaining one of the other two elements of the first differential device against movement in a direction opposite to that imparted to it by the primary charging means, a spring acting on the first differential device and tending to move the said latter element in a direction opposite to that imparted to it by the primary charging means, secondary charging means for charging the mechanism of both differential devices by a movement of the second differential device during which the element connected to the switch parts remains stationary and by a movement of the first differential device during which the element retained by the said primary detent is held stationary, two secondary detents for retaining each of the two other elements of the second differential device in a direction opposite to that imparted to it by the secondary charging means, said spring being adapted to act through said operative connection between the first and second differential devices on the second differential device so as to tend to move each of the latter two elements of the second differential device in a direction opposite to that imparted to it by the secondary charging means, means for releasing one of the secondary detents so that the spring brings about an initial closure of the switch, means for thereafter operating the secondary charging means and for re-engaging the last named secondary detent, means for releasing the other secondary detent so that the spring brings about an intermediate opening movement of the switch, means for re-engaging the latter secondary detent, and means for releasing the primary detent so that the spring brings about a final opening movement of the switch.

12. Spring driven operating mechanism for an electric switch having switch parts adapted to be operated by said mechanism, comprising first and second differential levers, three pivots spaced apart along each differential lever, an operative connection between the intermediate pivot of the first differential lever and the second differential lever, an operative connection between one extreme pivot of the second differential lever and the switch parts to be operated, primary charging means for charging the mechanism of the first differential lever by a rotative movement of said lever, means adapted to hold the pivot connected to the second differential lever stationary during this charging movement, a primary detent for retaining one of the extreme pivots of the first differential lever against movement in a direction opposite to that imparted to it by the primary charging means, a spring acting on the first differential lever and tending to move the said extreme element thereof in a direction opposite to that imparted to it by the primary charging means, secondary charging means for charging the mechanism of both differential levers by a rotative movement of the second differential lever during which the extreme pivot connected to the switch parts remains stationary and by a movement of the first differential lever during which the pivot retained by the primary detent is held stationary, two secondary detents one for retaining each of the other extreme pivots and the intermediate pivot of the second differential lever in a direction opposite to that imparted to it by the secondary charging means, the operative connection between the first differential lever and the second differential lever being connected to the latter at a point between the pivots associated with the secondary detents, means for releasing one of the secondary detents so that the spring brings about an initial closure of the switch, means for thereafter operating the second charging means and for re-engaging the last named secondary detent, means for thereafter releasing the other secondary detent so that the spring brings about an intermediate opening movement of the switch, means for re-engaging the latter secondary detent, and means for releasing the primary detent so that the spring brings about a final opening movement of the switch.

ARCHIBALD ALLAN.
JOSEPH FREDERICK STRICKLAND SMALL.

REFERENCES CITED

The following references are of record in the file of this patent:

UNITED STATES PATENTS

| Number | Name | Date |
|---|---|---|
| 1,900,584 | Rea | Mar. 7, 1933 |